US008284323B2

(12) United States Patent
Yamaguchi et al.

(10) Patent No.: US 8,284,323 B2
(45) Date of Patent: Oct. 9, 2012

(54) VIDEO AUDIO PROCESSING DEVICE AND STANDBY AND RETURN METHOD THEREOF

(75) Inventors: Tomokuni Yamaguchi, Nara (JP); Norihiko Mizobata, Osaka (JP); Shirou Yoshioka, Hyogo (JP)

(73) Assignee: Panasonic Corporation, Osaka (JP)

( * ) Notice: Subject to any disclaimer, the term of this patent is extended or adjusted under 35 U.S.C. 154(b) by 687 days.

(21) Appl. No.: 12/440,713

(22) PCT Filed: Jul. 8, 2008

(86) PCT No.: PCT/JP2008/001826
§ 371 (c)(1),
(2), (4) Date: Mar. 10, 2009

(87) PCT Pub. No.: WO2009/011104
PCT Pub. Date: Jan. 22, 2009

(65) Prior Publication Data
US 2010/0073573 A1 Mar. 25, 2010

(30) Foreign Application Priority Data

Jul. 18, 2007 (JP) ................................ 2007-187045

(51) Int. Cl.
*H04N 7/01* (2006.01)
(52) U.S. Cl. ...................................................... 348/730
(58) Field of Classification Search .................. 348/730, 348/725, 552, 553; 713/323, 300, 320; 345/211, 345/212, 213
See application file for complete search history.

(56) References Cited

U.S. PATENT DOCUMENTS

| | | | |
|---|---|---|---|
| 6,011,546 A | 1/2000 | Bertram | |
| 6,065,124 A * | 5/2000 | Lee | 713/323 |
| 6,223,293 B1 * | 4/2001 | Foster et al. | 713/300 |
| 6,981,159 B2 * | 12/2005 | Maeda | 713/300 |
| 7,380,146 B2 * | 5/2008 | Swope | 713/320 |

(Continued)

FOREIGN PATENT DOCUMENTS

| | | |
|---|---|---|
| CN | 1661561 A | 8/2005 |
| JP | 2002-185549 | 6/2002 |
| JP | 2005-529399 | 9/2005 |
| JP | 2006-261996 | 9/2006 |

(Continued)

OTHER PUBLICATIONS

Chinese Office Action issued in Chinese Patent Application No. 200880000706.0, dated Mar. 2, 2011.

(Continued)

*Primary Examiner* — Paulos Natnael
(74) *Attorney, Agent, or Firm* — McDermott Will & Emery LLP (57) ABSTRACT

In a video audio processing device, a signal processing block (11, 12) includes an instruction memory (111, 121) and performs signal processing in accordance with a program loaded into the instruction memory. A main storage section (20) has a self-refresh function and is accessible from the signal processing block. An auxiliary storage section (30) stores the program for making the signal processing block perform the signal processing. Upon receipt of a standby instruction, a control section (15) performs control in such a manner as to transfer the program from the auxiliary storage section to the main storage section, and set self-refresh in the main storage section, and upon receipt of a return instruction, performs control in such a manner as to cancel the self-refresh in the main storage section, load the program from the main storage section to the instruction memory in the signal processing block, and activate the signal processing block.

11 Claims, 7 Drawing Sheets

U.S. PATENT DOCUMENTS

| | | | |
|---|---|---|---|
| 7,388,800 B2 * | 6/2008 | Maeda | 365/226 |
| 7,821,864 B2 * | 10/2010 | Totolos et al. | 365/227 |
| 2005/0268157 A1 | 12/2005 | Campanale | |
| 2006/0061696 A1 | 3/2006 | Miyazawa | |
| 2007/0070439 A1 | 3/2007 | Tone | |

FOREIGN PATENT DOCUMENTS

| | | |
|---|---|---|
| JP | 2007-062137 | 3/2007 |
| JP | 2007-088522 | 4/2007 |

OTHER PUBLICATIONS

English Translation of pertinent part of "Instant Startup" Technique for Digital home Appliances: Hibernation in Linux Implementing Appliances, Yoshinori Kumura and Tetsuya Maezawa, Nikkei Electronics, Jun. 2, 2008, pp. 128-140.

Extended European Search Report issued in European Patent Application No. 08790178.1 dated Nov. 3, 2011.

* cited by examiner

VIDEO AUDIO PROCESSING DEVICE AND STANDBY AND RETURN METHOD THEREOF

RELATED APPLICATIONS

This application is the U.S. National Phase under 35 U.S.C. §371 of International Application No. PCT/JP2008/001826, filed on Jul. 8, 2008, which in turn claims the benefit of Japanese Application No. 2007-187045, filed on Jul. 18, 2007, the disclosures of which Applications are incorporated by reference herein.

TECHNICAL FIELD

The present invention relates to a device for processing video and audio signals of digital television broadcasts, and particularly relates to techniques for standby and return of the device.

BACKGROUND ART

Video audio processing devices typically go to a standby state when power is turned off by remote control. In the standby state, only minimum necessary circuit elements (for example, a standby microcomputer) are provided with power, and the others (for example, a video signal decoder, an audio signal decoder, etc.) are not provided with power. This allows the device to be ready for use more quickly as compared to when the main power is turned on, while lowering power consumption.

Various dedicated signal processors or signal processing blocks (for example, a TS (Transport Stream) decoder, a video decoder, an audio decoder, etc.) are particularly incorporated into digital television broadcast receivers or the like. There are various compression coding methods for video and audio signals. Thus, in order to be compatible with all of those methods, each signal processing block loads a program into an internal instruction memory thereof and operates. Such programs are stored in an auxiliary storage, such as a flash memory, and are retained even if power is not supplied.

When the video audio processing device returns from the standby state, a program stored in the auxiliary storage is first loaded into a CPU that controls each signal processing block, and the CPU starts operating. Thereafter, programs for the respective signal processing blocks are read from the auxiliary storage by the CPU and then loaded into the instruction memories in the respective signal processing blocks. And when the loading of the programs into the signal processing blocks is complete, each signal processing block is activated by the CPU, and the video audio processing device returns to a normal operational state. For example, in the case of a digital television broadcast receiver, broadcast contents are displayed on the screen. Therefore, an improvement of performance relating to access to the auxiliary storage is an important factor in achieving a quick return from the standby state. A technique has been conventionally known in which performance relating to access to a flash memory, in particular, performance relating to write access, is improved to enhance the speed of the entire system (see Patent Document 1, for example).

Patent Document 1: Japanese Unexamined Patent Application Publication No. 2005-529399

DISCLOSURE OF THE INVENTION

Problem that the Invention Intends to Solve

To return from the standby state and display broadcast contents, the digital television broadcast receiver needs a relatively long time, which is several seconds to several tens of seconds (approximately 30 seconds at the longest). In particular, the time required for the loading of the programs for the CPU and the signal processing blocks from the auxiliary storage accounts for a large proportion.

The problem with long return time has been conventionally recognized. However, since the program size has been relatively small, attention has not been paid to the problem about the program loading. Nevertheless, applications incorporated into digital television broadcast receivers are expected to increase further in functionality and in size in future. Along with this increase, the size of programs loaded into the CPU and the signal processing blocks is also expected to increase further. Hence, the time required for the digital television broadcast receivers to return from the standby state and display broadcast contents on the screen may increase more and more.

In view of the above problem, it is therefore an object of the present invention to enable a video audio processing device for digital television broadcasts to quickly return from a standby state to an operational state.

Means for Solving the Problem

In order to achieve the object, an inventive video audio processing device for processing video and audio signals of digital television broadcasts includes: a signal processing block including an instruction memory and performing signal processing in accordance with a program loaded into the instruction memory; a main storage section having a self-refresh function and being accessible from the signal processing block; an auxiliary storage section for storing the program for making the signal processing block perform the signal processing; and a control section for, upon receipt of a standby instruction, performing control in such a manner as to transfer the program from the auxiliary storage section to the main storage section, and set self-refresh in the main storage section, and upon receipt of a return instruction, performing control in such a manner as to cancel the self-refresh in the main storage section, load the program from the main storage section to the instruction memory in the signal processing block, and activate the signal processing block. Also, an inventive standby and return method of a video audio processing device, which processes video and audio signals of digital television broadcasts and which includes a signal processing block including an instruction memory and performing signal processing in accordance with a program loaded into the instruction memory, a main storage section having a self-refresh function and being accessible from the signal processing block, and an auxiliary storage section for storing the program for making the signal processing block perform the signal processing, includes: a step of, upon receipt of a standby instruction, transferring the program from the auxiliary storage section to the main storage section; a step of putting the main storage section in a self-refresh state after the transfer of the program; a step of, upon receipt of a return instruction, canceling the self-refresh state of the main storage section; a step of loading the program from the main storage section to the instruction memory in the signal processing block after the cancellation of the self-refresh state; and a step of activating the signal processing block after the loading of the program.

In the inventive device and method, as a result of the standby instruction, the program stored in the auxiliary storage section is transferred to the main storage section, and while the video audio processing device is in the standby state, the transferred program is retained by the self-refresh function in the main storage section. And, by the return instruction, the self-refresh in the main storage section is cancelled, and the program retained therein is loaded into the instruction memory in the signal processing block, causing the signal processing block to be activated. Thus, a quick return from the standby state to the operational state is achieved.

Specifically, the main storage section includes a plurality of storage devices. In this case, the video audio processing device includes a plurality of power supply circuits for controlling power supply to the respective storage devices, and upon receipt of the standby instruction, the control section controls one of the power supply circuits that is associated with a storage device to which the program is transferred in such a manner that the one of the power supply circuits supplies power to that storage device, and controls the other power supply circuits in such a manner that power supply therefrom is stopped. Similarly, the standby and return method of the video audio processing device includes a step of, upon receipt of the standby instruction, supplying power to one of the storage devices to which the program is transferred, while stopping power supply to the other storage devices. Therefore, during standby, power only needs to be supplied to the storage device to which the program has been transferred, whereby standby power is reduced to the bare minimum.

The video audio processing device preferably includes a storage device specification section for specifying the one of the storage devices to which the program is transferred. In this case, the control section performs control in such a manner as to transfer the program to the one of the storage devices specified by the storage device specification section. Also, the video audio processing device preferably includes an operational mode switching section for switching an operational mode relating to standby and return of the video audio processing device between a high speed mode, in which the various controls performed by the control section are validated, and a normal mode, in which the various controls performed by the control section are invalidated. More preferably, when a predetermined amount of time or more has elapsed after the video audio processing device has gone to a standby state in the high speed mode, the operational mode switching section switches the operational mode relating to the standby and return of the video audio processing device to the normal mode.

Effects of the Invention

According to the invention, the video audio processing device for digital television broadcasts achieves a quick return from the standby state to the operational state.

EXPLANATION OF THE REFERENCE CHARACTERS

1 Video audio processing device
2 Standby microcomputer
11 TS decoder (Signal processing block)
111 Instruction memory
12 AV decoder (Signal processing block)
121 Instruction memory
15 CPU (Control section)
20 Main storage section
21 Storage device
30 Auxiliary storage section
40 Power supply circuit
50 Operational mode switching section
60 Storage device specification section
100 Digital television broadcast receiver

BEST MODE FOR CARRYING OUT THE INVENTION

Figure 1:
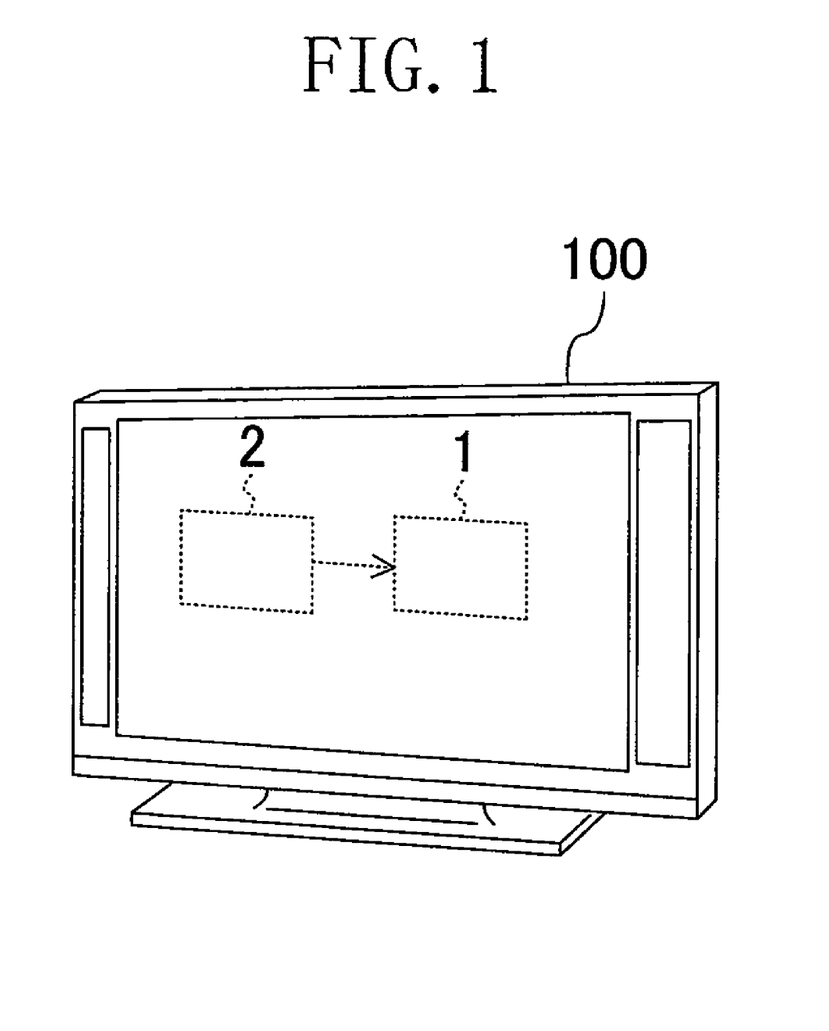
FIG. 1 illustrates the structure of a digital television broadcast receiver according to an embodiment of the invention.
Figure 2:
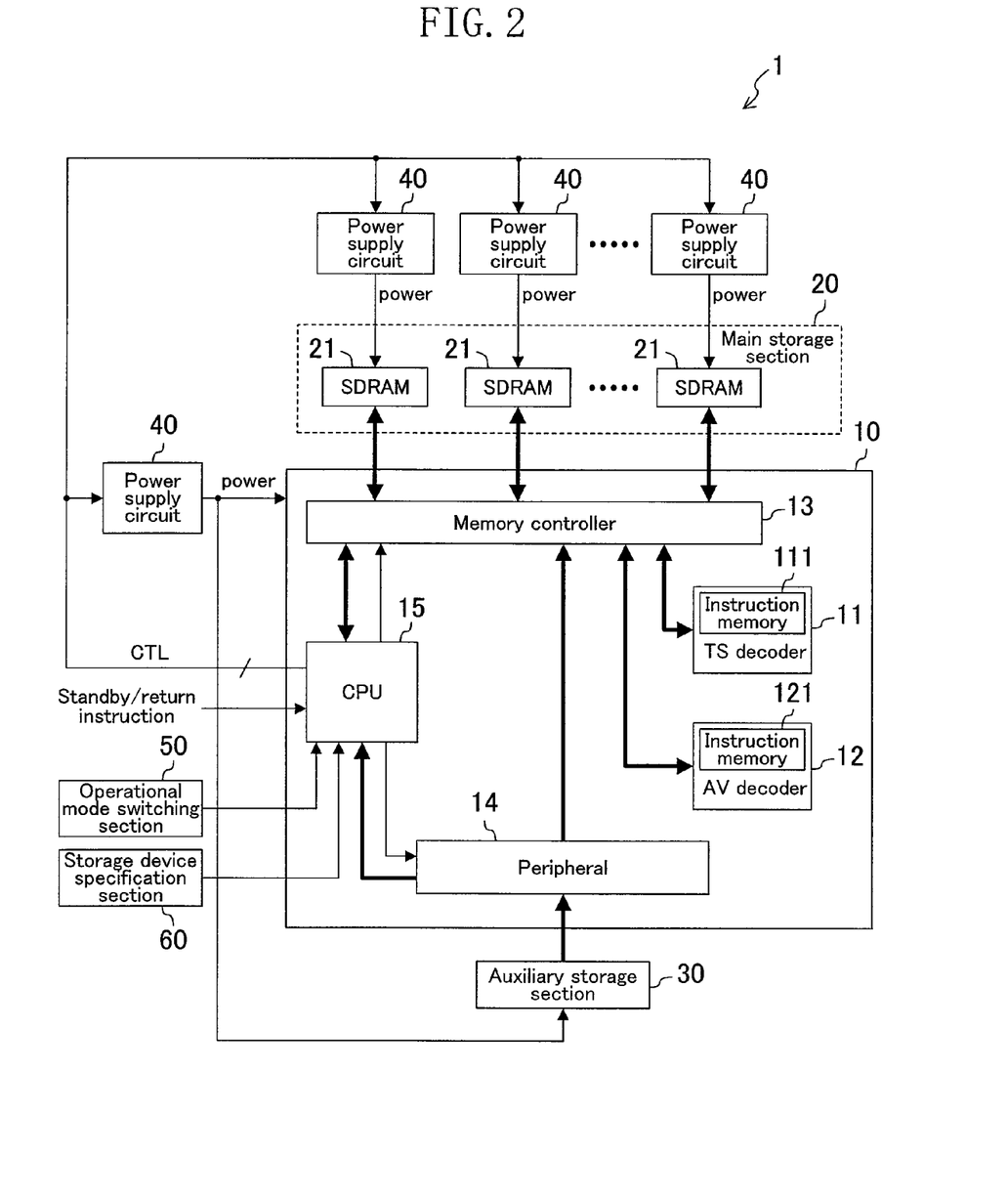
FIG. 2 illustrates the configuration of a video audio processing device according to the embodiment of the invention.

Hereinafter, the embodiments of the present invention will be described with reference to the accompanying drawings. FIG. 1 illustrates the structure of a digital television broadcast receiver according to an embodiment of the present invention. The digital television broadcast receiver 100 includes a video audio processing device 1 for processing video and audio signals of digital television broadcasts, and a standby microcomputer 2, which operates when the video audio processing device 1 is in a standby state, and, upon receipt of a return instruction, makes the video audio processing device 1 return from the standby state to an operational state. FIG. 2 illustrates the configuration of the video audio processing device 1. The thick lines in the figure show the flows of data. Now, the video audio processing device 1 will be discussed in detail.

In a system LSI 10, a TS decoder 11 decodes a received transport stream in accordance with a program (a microcode) loaded into an internal instruction memory 111 thereof. From the decoding result obtained by the TS decoder 11, an AV decoder 12 decodes video and audio signals in accordance with a program (a microcode) loaded into an internal instruction memory 121 thereof. A memory controller 13 controls interface between the system LSI 10 and a main storage section 20. A peripheral 14 controls interface between the system LSI 10 and an auxiliary storage section 30. A CPU 15 performs various controls over the above-described elements included in the system LSI 10. For the convenience of description, it is assumed that the two signal processing blocks, i.e., the TS decoder 11 and the AV decoder 12, are incorporated into the system LSI 10, however, other signal processing blocks may also be incorporated.

The main storage section 20 includes a plurality of storage devices 21 and is accessible from the TS decoder 11, the AV decoder 12, the CPU 15, and the like through the memory controller 13. To be specific, the storage devices 21 may be composed of high speed memories having a self-refresh function, such as DDR-SDRAMs or DDR2-SDRAMs.

The auxiliary storage section 30 stores programs that are executed by the TS decoder 11, the AV decoder 12, the CPU 15, and the like. The contents stored in the auxiliary storage section 30 are read into the system LSI 10 through the peripheral 14. Specifically, the auxiliary storage section 30 is composed of a nonvolatile memory, such as a NAND flash memory or a NOR flash memory, and keeps retaining the programs even if power is not supplied.

A plurality of power supply circuits 40 control power supply to the system LSI 10, to the storage devices 21, and to the auxiliary storage section 30 in accordance with a control signal CTL from the CPU 15. That is, the power supply to the respective storage devices 21 is controllable independently of each other.

An operational mode switching section 50 switches an operational mode relating to standby and return of the video audio processing device 1 between a high speed mode, in which program transfer is controlled by the CPU 15, and a normal mode, in which program transfer is not controlled by the CPU 15. Specifics of the program transfer control by the CPU 15 will be described later. When the video audio processing device 1 goes to a standby state in the high speed mode, a storage device specification section 60 specifies to a storage device 21 to which programs should be transferred. The CPU 15 operates in accordance with the contents of instructions received from the operational mode switching section 50 and from the storage device specification section 60.

Next, a description will be made of operations in which the video audio processing device 1 of this embodiment goes to a standby state from an operational state and then returns to the operational state.

(First Operation Example)

Figure 3:
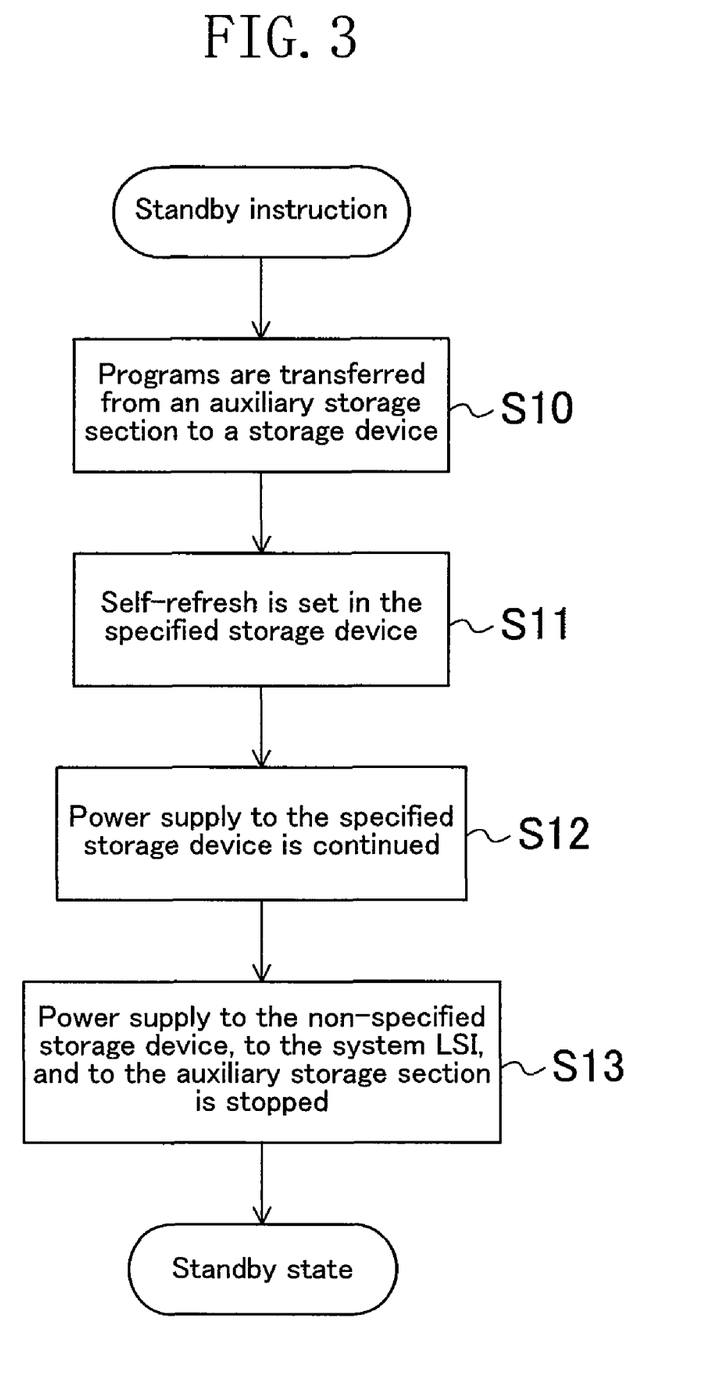
FIG. 3 is a flow chart in which a transition to a standby state is made according to a first operation example.

In a first operation example, the video audio processing device 1 operates in the high speed mode. FIG. 3 shows the flow in which a transition to a standby state is made according to the first operation example. When a standby instruction is issued by remote control or the like, the CPU 15 performs control so that programs are transferred from the auxiliary storage section 30 to the storage device 21 specified by the storage device specification section 60 (S10). To be specific, under control of the CPU 15, the memory controller 13 issues an access request to the storage device 21 specified by the storage device specification section 60. The peripheral 14 reads the programs from the auxiliary storage section 30. The programs are then transferred by DMA transfer from the peripheral 14 to the specified storage device 21 through the memory controller 13. The programs transferred at this time are a program to be executed by the CPU 15 upon startup, and programs for making the TS decoder 11 and the AV decoder 12 each perform predetermined signal processing.

When it is ensured that the programs transferred to the storage device 21 will not be deleted through ordinary processing, the programs may be transferred to the specified storage device 21 before the standby instruction is issued.

When the program transfer to the specified storage device 21 is complete, the CPU 15 performs control so that self-refresh is set in the specified storage device 21 (S11). Specifically, under control of the CPU 15, the memory controller 13 issues a command to start self-refresh to the specified storage device 21. Upon receipt of the standby instruction, the CPU 15 also controls the power supply circuit 40 that supplies power to the specified storage device 21 in such a manner that the power supply thereto is continued (S12). On the other hand, the CPU 15 controls the power supply circuits 40 that supply power to the other storages devices 21, that is, the storage devices 21 that are not specified by the storage device specification section 60, to the system LSI 10, and to the auxiliary storage 30 in such a manner that the power supply thereto is stopped (S13). This puts the video audio processing device 1 in a standby state in which a high speed return is possible. In this standby state, only the storage device 21 that performs self-refresh is supplied with power. Thus, power consumption by the video audio processing device 1 being in the standby state is reduced to the bare minimum.

If the CPU 15 becomes inactive, the program transfer described above cannot be controlled, and thus, stoppage of the power supply at least to the system LSI 10 must be performed at the end of the above-described series of processing. To that end, after receiving notification of the fact that the programs have been transferred to the specified storage device 21 and the self-refresh has started, the CPU 15 may issue, to the power supply circuit 40 connected with the system LSI 10, an instruction to stop the power supply. Alternatively, after a sufficiently long time has elapsed since the receipt of the standby instruction, the CPU 15 may issue the instruction to stop the power supply to the power supply circuit 40 connected with the system LSI 10.

Also, if partial self-refresh is possible in the storage device 21, such partial self-refresh may be performed in the storage device 21 according to the size of the programs transferred. If the storage device 21 is of a type which retains stored contents just by being supplied with power, the power supply thereto may be continued without using the self-refresh function so as to retain the transferred programs.

Figure 4:
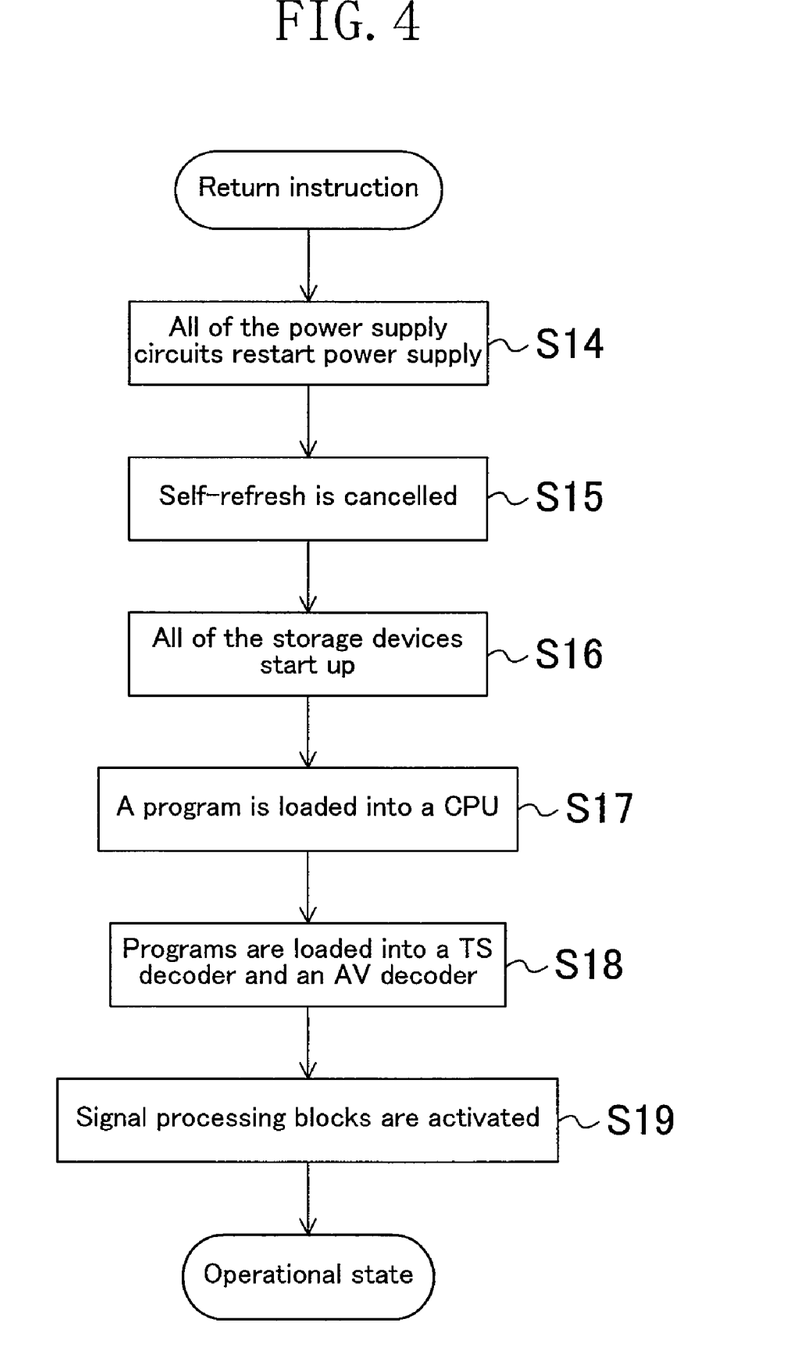
FIG. 4 is a flow chart in which a transition to an operational state is made according to the first operation example.

FIG. 4 shows the flow in which a transition to an operational state is made according to the first operation example. When a return instruction is issued by remote control or the like to the video audio processing device 1 which is in the standby state, the standby microcomputer 2 shown in FIG. 1 controls all of the power supply circuits 40 in such a manner that these power supply circuits 40 supply power. This causes the power supply to the system LSI 10 to be restarted (S14). As a result of receiving the return instruction, the CPU 15 outputs a predetermined signal to the memory controller 13. Upon receipt of that signal, the memory controller 13 issues a "self-refresh cancellation" command to the storage device 21 in which self-refresh is being performed (S15), and also issues a command for startup to all of the storage devices 21 (S16).

When the storage devices 21 start up to permit program reading, a program is first loaded into the CPU 15 (S17). According to the loaded program, the CPU 15 performs control so that programs are loaded from the storage device 21 that retains the programs to the TS decoder 11 and to the AV decoder 12 (S18). To be specific, under control of the CPU 15, the memory controller 13 reads the programs from that storage device 21 and transfers the read programs to the instruction memory 111 in the TS decoder 11 and to the instruction memory 121 in the AV decoder 12. When the loading of the programs to the TS decoder 11 and the AV decoder 12 is complete, the CPU 15 performs control in such a manner as to activate these signal processing blocks (S19). As a result, the TS decoder 11 and the AV decoder 12 start predetermined signal processing to reproduce the digital broadcast program.

(Second Operation Example)

Figure 5:
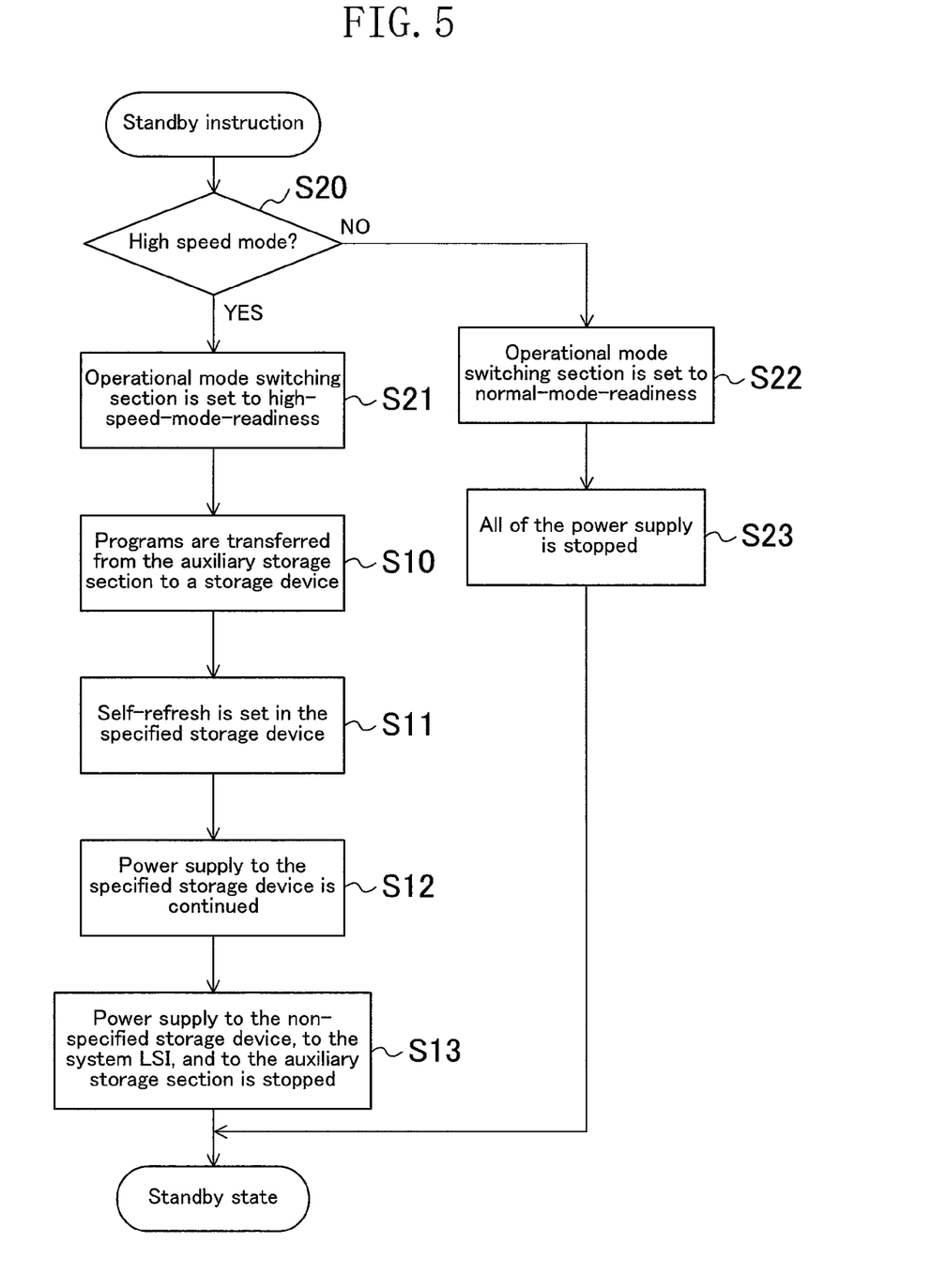
FIG. 5 is a flow chart in which a transition to a standby state is made according to a second operation example.

In a second operation example, switching between the high speed mode and the normal mode is performed according to the user's selection. FIG. 5 shows the flow in which a transition to a standby state is made according to the second operation example. When a standby instruction is issued by remote control or the like, it is determined whether the video audio processing device 1 is made to transition to the standby state either in the high speed mode or in the normal mode (S20). To be specific, a display or the like for the operational mode selection is produced on the digital television broadcast receiver 100, and the user selects an operational mode. When the high speed mode is selected, the operational mode switching section 50 is set to high-speed-mode-readiness (S21). As a result, the video audio processing device 1 is put in the standby state, in which a high speed return is possible, through the steps S10 to S13 described above. On the other hand, when the normal mode is selected, the operational mode switching section 50 is set to normal-mode-readiness (S22). As a result, power supply to all of the storage devices 21 in the main storage section 20 is stopped (S23), and then the video audio processing device 1 goes to the normal standby state.

Figure 6:
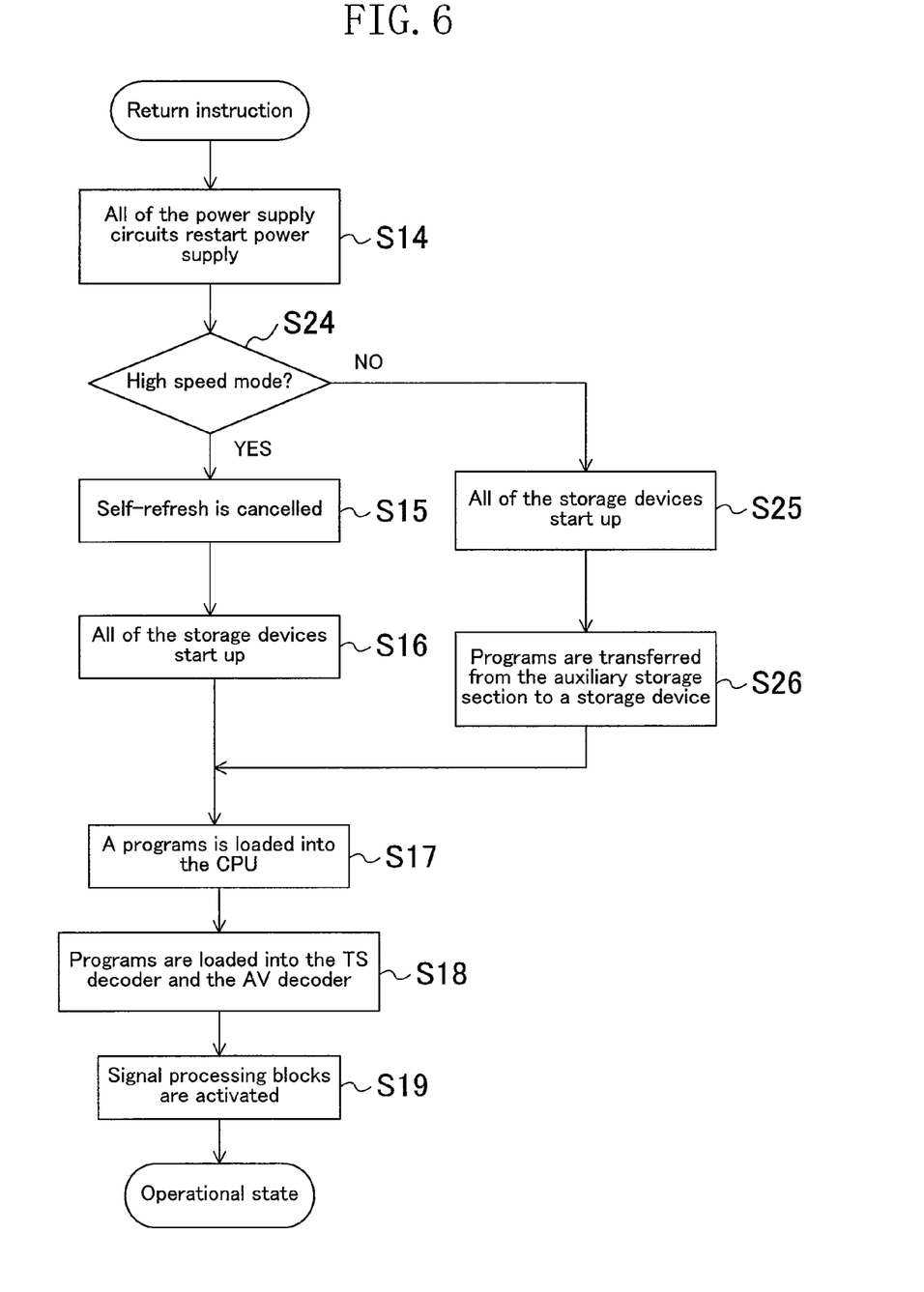
FIG. 6 is a flow chart in which a transition to an operational state is made according to the second and third operation examples.

FIG. 6 shows the flow in which a transition to an operational state is made according to the second operation example. When a return instruction is issued by remote control or the like to the video audio processing device 1 which is in the standby state, the standby microcomputer 2 shown in FIG. 1 controls all of the power supply circuits 40 in such a manner that these power supply circuits 40 supply power. This causes the power supply to the system LSI 10 to be restarted (S14). Thereafter, it is determined whether the operational mode switching section 50 has been set to either high-speed-mode-readiness or normal-mode-readiness (S24). When the operational mode switching section 50 has been set to high-speed-mode-readiness, the video audio processing device 1 is put in the operational state through the steps S15 to S19 described above. On the other hand, when the operational mode switching section 50 has been set to normal-mode-readiness, the memory controller 13 issues a command for startup to all of the storage devices 21 (S25). Then, necessary programs are transferred from the auxiliary storage section 30 to a storage device 21 (S26). Specifically, under control of the CPU 15, the memory controller 13 issues an access request to the storage device 21 specified by the storage device specification section 60. The peripheral 14 reads the programs from the auxiliary storage section 30. The programs are then transferred by DMA transfer from the peripheral 14 to the specified storage device 21 through the memory controller 13. When the transfer of the necessary programs is complete, the video audio processing device 1 goes to the operational state through the steps S17 to S19 described above.

(Third Operation Example)

Figure 7:
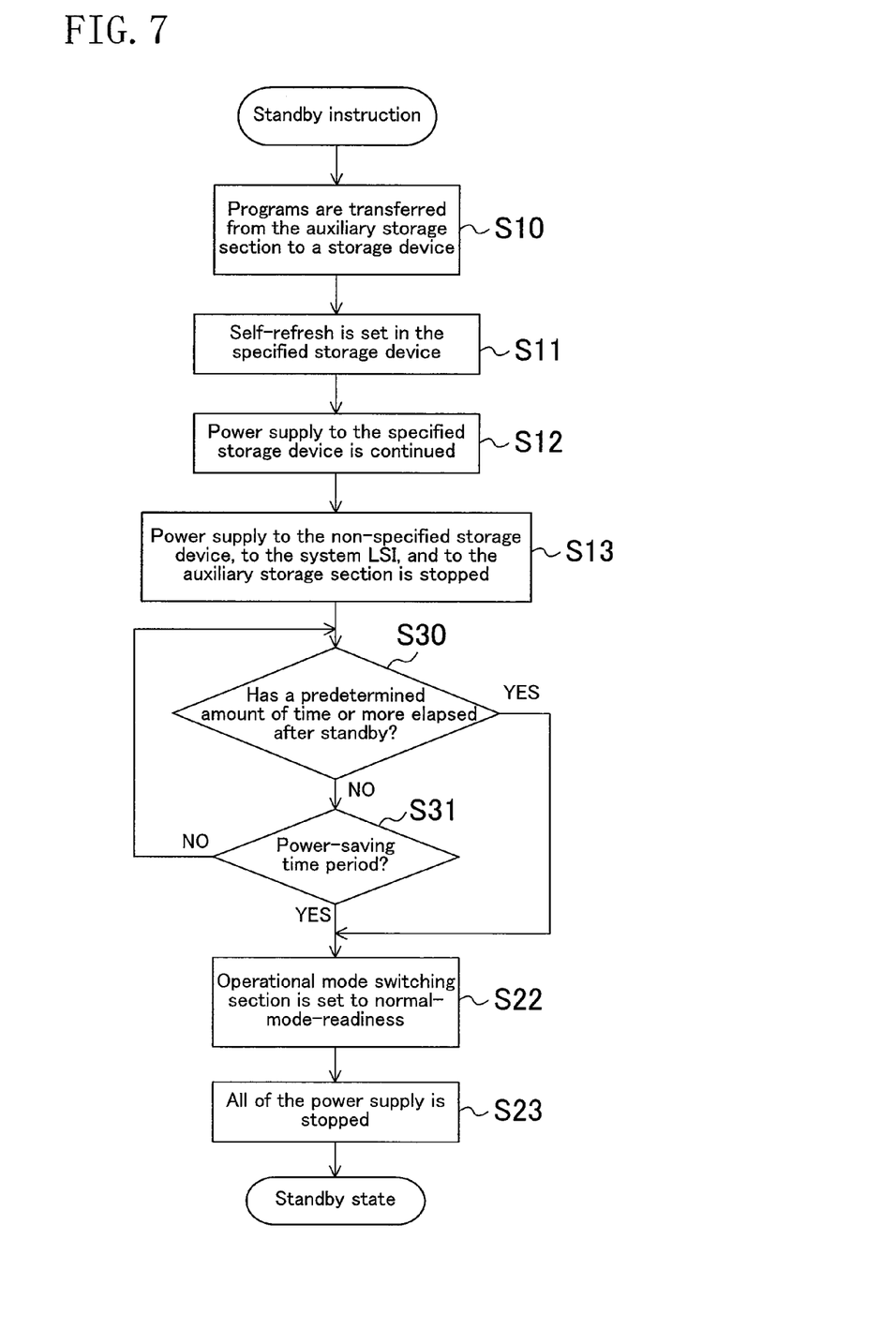
FIG. 7 is a flow chart in which a transition to a standby state is made according to the third operation example.

In a third operation example, switching between the high speed mode and the normal mode is performed by the system according to the situation. FIG. 7 shows the flow in which a transition to a standby state is made according to the third operation example. When a standby instruction is issued by remote control or the like, the video audio processing device 1 goes to an interim standby state, in which a high speed return is possible, through the steps S10 to S13 described above. And when a predetermined amount of time or more has elapsed after the video audio processing device 1 has gone to the interim standby state (S30), the video audio processing device 1 is put in a normal standby state through the steps S22 and S23 described above. That is, if a return instruction is not issued within the predetermined amount of time after the video audio processing device 1 has gone to the standby state in the high speed mode, the operational mode of the video audio processing device 1 is switched to the normal mode so as to give higher priority to power savings. Even when the predetermined amount of time or more has not elapsed after the video audio processing device 1 has gone to the interim standby state, the video audio processing device 1 may be put in the normal standby state through the steps S22 and S23 described above if the current time is in the time periods in which power savings should be achieved (for example, late at night when the user does not watch television programs) (S31). The transition to an operational state according to the third operation example is made in the same manner as described in the second operation example.

As described above, according to this embodiment, the program transfer from the auxiliary storage section 30 to the main storage section 20, which accounts for a large proportion in the return processing in the video audio processing device 1, is omitted, thereby allowing the video audio processing device 1 to return to the operational state even in a time less than half that required conventionally. Furthermore, during standby, power only needs to be supplied to the storage device 21 that retains the transferred programs by self-refresh, so that power consumption is reduced to the bare minimum.

The operational mode switching section 50 and the storage device specification section 60 are optional, and may be omitted. Also, in this embodiment, the main storage section 20 is composed of the multiple storage devices 21, but may be composed of a single storage device 21.

INDUSTRIAL APPLICABILITY

The video audio processing device according to the present invention is capable of quickly returning from a standby state to an operational state, and is thus applicable to digital television broadcast receivers.

The invention claimed is:

1. A video audio processing device for processing video and audio signals, the device comprising:
   a signal processing block including an instruction memory and performing signal processing in accordance with a program loaded into the instruction memory;
   a main storage section having a self-refresh function and being accessible from the signal processing block;
   an auxiliary storage section for storing the program for making the signal processing block perform the signal processing; and
   a control section for, upon receipt of a standby instruction, transferring the program from the auxiliary storage section to the main storage section, and set setting self-refresh in the main storage section, and upon receipt of a return instruction, canceling the self-refresh in the main storage section, loading the program from the main storage section to the instruction memory in the signal processing block, and activating the signal processing block.

2. The video audio processing device of claim 1, wherein the main storage section includes an SDRAM, and the auxiliary storage section includes a flash memory.

3. A video audio processing device for processing video and audio signals of digital television broadcasts, the device comprising:
   a signal processing block including an instruction memory and performing signal processing in accordance with a program loaded into the instruction memory;
   a main storage section having a self-refresh function and being accessible from the signal processing block;
   an auxiliary storage section for storing the program for making the signal processing block perform the signal processing; and
   a control section for, upon receipt of a standby instruction, performing control in such a manner as to transfer the program from the auxiliary storage section to the main storage section, and set self-refresh in the main storage section, and upon receipt of a return instruction, performing control in such a manner as to cancel the self-refresh in the main storage section, load the program from the main storage section to the instruction memory in the signal processing block, and activate the signal processing block, wherein the main storage section includes a plurality of storage devices;

the video audio processing device includes a plurality of power supply circuits for controlling power supply to the respective storage devices; and upon receipt of the standby instruction, the control section controls one of the power supply circuits that is associated with a storage device to which the program is transferred in such a manner that the one of the power supply circuits supplies power to that storage device, and controls the other power supply circuits in such a manner that power supply therefrom is stopped.

4. The video audio processing device of claim 3, comprising a storage device specification section for specifying the one of the storage devices to which the program is transferred, wherein the control section performs control in such a manner as to transfer the program to the one of the storage devices specified by the storage device specification section.

5. The video audio processing device of claim 4, comprising an operational mode switching section for switching an operational mode relating to standby and return of the video audio processing device between a high speed mode, in which the various controls performed by the control section are validated, and a normal mode, in which the various controls performed by the control section are invalidated.

6. The video audio processing device of claim 3, comprising an operational mode switching section for switching an operational mode relating to standby and return of the video audio processing device between a high speed mode, in which the various controls performed by the control section are validated, and a normal mode, in which the various controls performed by the control section are invalidated.

7. A video audio processing device for processing video and audio signals of digital television broadcasts, the device comprising:

a signal processing block including an instruction memory and performing signal processing in accordance with a program loaded into the instruction memory;

a main storage section having a self-refresh function and being accessible from the signal processing block;

an auxiliary storage section for storing the program for making the signal processing block perform the signal processing;

a control section for, upon receipt of a standby instruction, performing control in such a manner as to transfer the program from the auxiliary storage section to the main storage section, and set self-refresh in the main storage section, and upon receipt of a return instruction, performing control in such a manner as to cancel the self-refresh in the main storage section load the program from the main storage section to the instruction memory in the signal processing block, and activate the signal processing block; and an operational mode switching section for switching an operational mode relating to standby and return of the video audio processing device between a high speed mode, in which the various controls performed by the control section are validated, and a normal mode, in which the various controls performed by the control section are invalidated.

8. The video audio processing device of claim 7, wherein when a predetermined amount of time or more has elapsed after the video audio processing device has gone to a standby state in the high speed mode, the operational mode switching section switches the operational mode relating to the standby and return of the video audio processing device to the normal mode.

9. A digital television broadcast receiver comprising:

the video audio processing device of claim 1, and a standby microcomputer, which operates when the video audio processing device is in a standby state, and, upon receipt of a return instruction, makes the video audio processing device return from the standby state to an operational state.

10. A standby and return method of a video audio processing device, which processes video and audio signals and which includes a signal processing block including an instruction memory and performing signal processing in accordance with a program loaded into the instruction memory, a main storage section having a self-refresh function and being accessible from the signal processing block, and an auxiliary storage section for storing the program for making the signal processing block perform the signal processing, the method comprising:

a step of, upon receipt of a standby instruction, transferring the program from the auxiliary storage section to the main storage section;

a step of putting the main storage section in a self-refresh state after the transfer of the program;

a step of, upon receipt of a return instruction, canceling the self-refresh state of the main storage section;

a step of loading the program from the main storage section to the instruction memory in the signal processing block after the cancellation of the self-refresh state; and a step of activating the signal processing block after the loading of the program.

11. A standby and return method of a video audio processing device, which processes video and audio signals of digital television broadcasts and which includes a signal processing block including an instruction memory and performing signal processing in accordance with a program loaded into the instruction memory, a main storage section having a self-refresh function and being accessible from the signal processing block, and an auxiliary storage section for storing the program for making the signal processing block perform the signal processing, wherein the main storage section includes a plurality of storage devices, and the method comprising:

a step of upon receipt of a standby instruction, transferring the program from the auxiliary storage section to the main storage section;

a step of putting the main storage section in a self-refresh state after the transfer of the program;

a step of upon receipt of a return instruction, canceling the self-refresh state of the main storage section;

a step of loading the program from the main storage section to the instruction memory in the signal processing block after the cancellation of the self-refresh state;

a step of activating the signal processing block after the loading of the program; and a step of, upon receipt of the standby instruction, supplying power to one of the storage devices to which the program is transferred, while stopping power supply to the other storage devices.

\* \* \* \* \*